United States Patent Office 3,067,254
Patented Dec. 4, 1962

3,067,254
N-(NITROPHENYL) LOWER ALKYLCYCLO-
HEXYLAMINES
Gene R. Wilder, St. Albans, W. Va., assignor to Monsanto Chemical Company, St. Louis, Mo., a corporation of Delaware
No Drawing. Filed Apr. 15, 1959, Ser. No. 806,449
5 Claims. (Cl. 260—576)

This invention relates to a class of nitro substituted aromatic amines, to selective herbicidal compositions and to methods employing them.

One of the important developments in agricultural chemistry in recent years has been the discovery of chemicals which act as selective herbicides. A suitable means for eradicating from grounds sowed to blue grass the highly obnoxious crab grass, other than by digging up this weed, has long been sought. However, few compounds have been discovered which will kill crab grass. Generally any active compounds also kill the perennial lawn grasses such as blue grass, at all concentrations toxic to crab grass.

It is an object of this invention to provide new compounds and compositions containing said compounds which will kill crab grass. It is also an object of this invention to provide compositions which will kill crab grass but will not kill blue grass. It is still another object of this invention to provide an efficient method for killing crab grass. A particular object is to provide a method for selectively killing crab grass in the presence of desired vegetation.

These and other objects, as will be apparent from the following description, are accomplished by the present invention. It has been discovered that 2-methyl-N-(2-nitrophenyl)cyclohexylamine destroys crab grass whether used as a pre-emergent treatment or as a post-emergent treatment. Useful results are achieved with certain related nitrophenylamines although N-cyclohexyl o-nitroaniline is completely inactive in either type of application. It does not kill crab grass. The crab grass problem in blue grass turf is an annual one. Crab grass arises each year from seed in the established blue grass turf. The germination of crab grass is prevented by applying to the turf 2-methyl-N-(2-nitrophenyl)cyclohexylamine before crab grass germinates in the spring. Later the toxicant may be applied post-emergent to established blue grass lawn or pasture. It is completely innocuous as a post-emergent spray even on young (3 weeks old) blue grass. There is slight to moderate inhibiting action on germinating blue grass seed.

The nitro substituted aromatic amines of the present invention are represented by the formula:

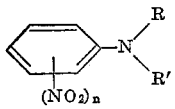

where R is preferably hydrogen but may, for example, be selected from the group consisting of hydrogen, lower alkylcyclohexyl, cyclohexylmethyl and lower alkyl cyclohexylmethyl, R' is preferably methylcyclohexyl but may, for example, be selected from the group consisting of lower alkylcyclohexyl, cyclohexylmethyl and lower alkylcyclohexylmethyl and $n$ is an integer at least one but not more than two.

Amines having the above formula are readily prepared by reaction of mono- or dinitrochlorobenzene with the appropriate amine. Although not essential, the reaction may be carried out in the presence of a solvent, for example dimethyl formamide. Excess of amine may be used as acid acceptor for by-product hydrogen chloride or a different acid acceptor, for example, a tertiary amine such as triethylamine, may be used.

The present invention is illustrated but not limited by the following examples:

EXAMPLE 1

A mixture of 39.5 grams (0.25 mole) of o-nitrochlorobenzene, 59 grams (0.25 mole) of di(1-methylcyclohexylmethyl)amine, 25 grams (0.25 mole) of triethylamine and 200 ml. of dimethyl formamide was heated under reflux for 14 hours. At the end of this time the mixture was cooled to 10° C., added to 1000 grams of ice-water and stirred for an hour. The mass was then acidified with concentrated hydrochloric acid and the separated solids removed by filtration. The filtrate was made basic with concentrated ammonium hydroxide and heavy oil extracted with ether. The ether extract was dried over sodium sulfate and the ether removed under vacuum. A 61% yield of N,N-bis(1-methylcyclohexylmethyl)-o-nitroaniline was obtained. The product was a brown oil analyzing 7.45% nitrogen as compared to 7.81% calculated for $C_{22}H_{34}N_2O_2$.

EXAMPLE 2

In the manner described in the foregoing example, 28 grams (0.25 mole) of hexahydrobenzylamine was substituted for the di-(1-methylcyclohexylmethyl)amine. The N-(cyclohexylmethyl)-o-nitroaniline thus obtained was a dark brown oil analyzing 12.87% nitrogen as compared to 11.94% calculated for $C_{13}H_{18}N_2O_2$.

EXAMPLE 3

In this example 32 grams (0.25 mole) of 1-methylcyclohexylmethylamine was substituted for the amine in Example 1. After the mixture had been added to the ice-water as above, the oil which formed was extracted with ether. The ether extract was then dried over sodium sulfate and the ether removed under vacuum to yield the desired N-(1-methylcyclohexylmethyl)-o-nitroaniline as a dark brown oil. Analysis gave 12.04% nitrogen as compared to 11.28% calculated for $C_{14}H_{20}N_2O_2$.

EXAMPLE 4

2-methyl-N-(2-nitrophenyl)cyclohexylamine was prepared in the absence of a solvent. 70 grams (0.44 mole) of o-nitrochlorobenzene and 115 grams (1.02 moles) of cis- and trans-2-methylcyclohexylamine from catalytic reduction of o-toluidine were heated at reflux for a period of 4 hours. The mixture was then cooled to 150° C. and decanted into 500 ml. of 10% hydrochloric acid with agitation. The crude dried product was washed with methanol and recrystallized from isopropanol to yield the desired product melting at 95–96° C. Analysis gave 11.8% nitrogen as compared to 11.95% calculated for $C_{13}H_{18}N_2O_2$.

The other isomer can be obtained by carrying out the reaction in methanol in which it is more soluble. The isomer isolated from the methanol is a liquid.

EXAMPLE 5

A mixture of 39.5 grams (0.25 mole) of p-nitrochlorobenzene, 25 grams (0.25 mole) of triethylamine and 200 ml. of dimethyl formamide were heated to 80–90° C. and 39 grams (0.25 mole) of 2,6-diethylcyclohexylamine added to the hot mixture over a period of 15 minutes. The resulting mixture was stirred at reflux for 14 hours. After cooling to room temperature the mixture was added to 1000 grams of ice-water and stirred for one hour at 0–20° C. The yellow solid which formed was separated by filtration, the filtrate washed with water and dried. After recrystallization from ethyl alcohol the N-(2,6-diethylcyclohexyl)-p-nitroaniline melted at 164–165° C. Analysis gave 10.05% nitrogen as compared to 10.14% calculated for $C_{16}H_{24}N_2O_2$.

Further examples of the new toxicants prepared in similar manner comprise:

N-(1-methylcyclohexyl)-o-nitroaniline
N-(1-methylcyclohexyl)-p-nitroaniline
N-(2,4,5-trimethylcyclohexyl)-o-nitroaniline
N-(2,4,5-trimethylcyclohexyl)-p-nitroaniline
N-(2-methylcyclohexyl)-2,4-dinitroaniline
N-(2-ethylcyclohexyl)-o-nitroaniline
N-(2-ethylcyclohexyl)-p-nitroaniline The herbicidal compositions of this invention are prepared by admixing the amine with herbicidal adjuvant as carrier to provide formulations in liquid or solid form. Solid compositions are prepared in the form of dusts or granules by admixing the active compound with finely divided solid carriers. Suitable carriers comprise talc, clay, pyrophyllite, silica and fuller's earth. Usually the toxicant will be only a minor proportion.

Liquid compositions are prepared in the usual way by admixing the active ingredient with a conventional liquid diluent media. Although most of the toxicants are insoluble in water, they are soluble in common organic solvents.

Whether in the form of solids or liquids, the compositions may also include a surface active dispersing agent. As surface active dispersing agents there may be employed soft or hard sodium or potasium soaps, alkylated aromatic sodium sulfonates, such as sodium dodecylbenzene sulfonate, an amine salt, as for example dibutylammonium dodecylbenzenesulfonate, alkali metal salts of sulfated fatty alcohols, ethylene oxide condensation products of the following: alkyl phenols, tall oil and higher mercaptans and other dispersing and wetting agents. The content of the active ingredient employed in the herbicidal compositions will vary accordilng to the manner in which the composition is to be applied. In general a concentration within the range of 0.05 to 10.0% by weight will be effective for contact action. For pre-emergence control amounts within the range of 3 to 50 pounds per acre may be used.

The valuable properties of the nitro substituted aromatic amines was demonstrated as follows:

Seeds of crab grass (*Digitaria sanguinalis*) from the family Gramineae (grasses) were planted in greenhouse flats, 20 seeds to the flat, and the flats treated with the test chemical at the rate equivalent to 25 pounds per acre. After spraying the pans were placed in one-half inch of water and allowed to absorb moisture through the perforated bottom until the soil surface was about one-half moist. The pans were then kept on a wet sand bench in a greenhouse for 14 days, after which the plant growth was observed and ratings recorded. Ratings were based on the number of seedlings emerging as compared to expected percent germination. In the scale, a rating of 3 indicates severe phytotoxicity, that is to say, no perceptible growth of crab grass, 2 moderate phytotoxicity, 1 slight phytotoxicity whereas a rating of 0 indicates that the test chemical has no perceptible phytotoxic effect. The data are given in Table I.

Table I

| Test chemical | Herbicide rating against crab grass after 14 days |
| --- | --- |
| 2-methyl-N-(2-nitrophenyl)cyclohexylamine | 3 |
| N-(1 methylcyclohexylmethyl)-o-nitroaniline | 3 |
| N-(cyclohexylmethyl)-o-nitroaniline | 2 |
| N-(2,6-diethylcyclohexyl)-p-nitroaniline | 3 |
| N,N-bis(1-methylcyclohexylmethyl)-o-nitroaniline | 3 |

The first compound, 2-methyl-N-(2-nitrophenyl)cyclohexylamine, destroys crab grass at rates as low as one-half pound per acre. While at this low rate of application crab grass was severely damaged, cotton and corn for example grew normally. Barnyard grass and foxtail were also destroyed but no toxicity to other plant species was observed. A spray containing 0.5% of 2-methyl-N-(2-nitrophenyl)cyclohexylamine was applied to 21 day old specimens of various grasses and broadleaf plants and to two bean plants (Black Valentine) having one mature trifoliat and one partially opened trifoliat. After 14 days the specimens were observed and the following data recorded. The mixture of broadleaf plants is indicated in the table as "Broadleaf." The ratings have the same significance as above.

|  | Phytotoxicity rating |
| --- | --- |
| Mixture of grasses | 1 |
| Bean | 0 |
| Broadleaf | 1 |
| Crab grass | 3 |

The above data show the selective control of crab grass afforded by the herbicidal compositions of this invention. Thus, they may be employed for the control of crab grass in plantings of corn, beans and cotton as well as for control of crab grass in established stands of perennial grasses such as blue grass.

It is intended to cover all changes and modifications of the examples of the invention herein choesn for purposes of disclosure which do not constitute departures from the spirit and scope of the invention.

What is claimed is:

1. A compound selected from the group consisting of N,N - bis(1 - methylcyclohexylmethyl) - o - nitroaniline, N - (cyclohexylmethyl) - o - nitroaniline, N - (1 - methylcyclohexylmethyl) - o - nitroaniline, 2 - methyl - N - (2-nitrophenyl)cyclohexylamine and N - (2,6 - diethylcyclohexyl)-p-nitroaniline.
2. N,N-bis(1-methylcyclohexylmethyl)-o-nitroaniline.
3. 2-methyl-N-(2-nitrophenyl)cyclohexylamine.
4. N-(1-methylcyclohexylmethyl)-o-nitroaniline.
5. N-(cyclohexylmethyl)-o-nitroaniline.

References Cited in the file of this patent

UNITED STATES PATENTS

| | | |
| --- | --- | --- |
| 2,059,800 | Laska et al. | Nov. 3, 1936 |
| 2,225,618 | Britton et al. | Dec. 12, 1940 |
| 2,608,479 | Boyd et al. | Aug. 26, 1952 |
| 2,783,278 | Thelin et al. | Feb. 26, 1957 |
| 2,813,124 | Rice et al. | Nov. 12, 1957 |

FOREIGN PATENTS

| | | |
| --- | --- | --- |
| 340,495 | Great Britain | Dec. 30, 1930 |

OTHER REFERENCES

Busch: "Chemical Abstracts," vol. 21, p. 1102 (1927).
De Vries: "Chemical Abstracts," vol. 38, pp. 2312–2313 (1949).
Beilstein: "Handbook Org. Chem.," 4th ed., vol. 12, 2nd suppl., page 407 (1950).